United States Patent [19]

Kolze et al.

[11] Patent Number: 4,697,608

[45] Date of Patent: Oct. 6, 1987

[54] ELECTROMAGNETIC VALVE ASSEMBLY

[75] Inventors: Lawrence A. Kolze, Bensenville; James M. Pick; Wesley S. Swanson, both of Elk Grove, all of Ill.

[73] Assignee: Eaton Corporation, Cleveland, Ohio

[21] Appl. No.: 858,426

[22] Filed: Apr. 30, 1986

[51] Int. Cl.$^4$ .................. F16K 31/06; F16K 27/10
[52] U.S. Cl. ................... 137/1; 251/129.15; 251/366; 285/82; 156/73.1
[58] Field of Search ............ 251/129.15, 366; 285/82, 81, 393, 356; 156/73.1; 137/1

[56] References Cited

U.S. PATENT DOCUMENTS

| | | | |
|---|---|---|---|
| 2,321,597 | 6/1943 | Hobbs | 285/356 X |
| 2,677,557 | 5/1954 | Worel | 285/393 X |
| 3,480,040 | 11/1969 | Erickson | 251/129.15 X |
| 4,067,541 | 1/1978 | Hunter | 251/129.15 |
| 4,175,590 | 11/1979 | Grandolement | 251/366 X |
| 4,262,877 | 4/1981 | Lang | 251/129.15 |
| 4,530,486 | 7/1985 | Rusnak | 251/129.18 X |

Primary Examiner—Arnold Rosenthal
Attorney, Agent, or Firm—D. A. Rowe; R. A. Johnston

[57] ABSTRACT

An electromagnetic solenoid operated plastic bodied appliance inlet valve having the armature, poppet, spring, elastomeric valve seat and plastic armature guide installed as a sub-assembly onto the valve body and secured thereon in fluid pressure sealing arrangement by weldment of a plastic retainer thereon. The electro-magnetic coil and pole frame are installed as a separate assembly. In one embodiment the valve inlet has a metal insert retained in the body by insertion of a metal spring clip and the body closed by weldment of a plastic cover thereover. In another embodiment the insert is retained by an annular ring received over the insert and secured to the body by weldment. The metal insert receives a threaded compression-type tube fitting for attachment of the supply tube. Reaction torque on the insert from the tube fitting is absorbed by the valve mounting bracket which engages hexagonal surfaces on the exterior end of the metal insert.

17 Claims, 10 Drawing Figures

ELECTROMAGNETIC VALVE ASSEMBLY

BACKGROUND OF THE INVENTION

The present invention relates to electrically energized electromagnetically actuated valves for service in appliances such as, for example, ice makers employed in household refrigerators. Valves of the aforesaid type are required to operate with a low wattage power consumption and to be compact and inexpensive to manufacture. In particular, electrically energized solenoid-actuated valve employed for use in refrigerator ice makers are required to provide long life when connected to water supplies of varying impurity and chemical content.

Heretofore, electrically operated valves for refrigerator ice makers have employed a solenoid actuated poppet and a valving chamber which is formed of plastic material to prevent corrosion and malfunction of the valve by build up of foreign matter in the valving chamber.

Appliance water inlet valves having the valving chamber formed of plastic material generally have the whole valve body formed of plastic material for simplicity and economy of manufacturing. Plastic bodied valves of this type which are solenoid actuated pose particular problems in design in manufacturing in providing for attachment of the water inlet line fittings to the plastic valve body.

Furthermore complications have arisen in attaching the iron-base magnetic pole pieces, coil and armature mechanism of the solenoid to the plastic valve body for enabling electrical actuation and opening of the valve by magnetomotive force means. It has also been found difficult to provide an easily attachable metal structure in the plastic valve body for attaching thereto metal tube fittings for connection of the water supply line to the valve. Where a metal tube-receiving insert is molded onto the plastic valve body, the torque required to effect a seal, upon attachment of a metal tube to the valve, has resulted in damage to the valve body by the reaction to the torque applied to the metal insert. Furthermore, it has been found to be quite costly in manufacturing to preplace a metal insert in each mold cavity for molding a plastic valve body around the insert. Therefore, it has long been desired to fine a way or means of providing for metal inserts in a plastic bodied valve for enabling attachment of metal tube fittings thereto without the necessity of molding a metal insert into the plastic valve body.

It is known to provide a valve mounting bracket attached to the exterior of a plastic valve body which bracket inter-engages portions of a metal insert molded in the body for absorbing the torque of installation of a metal tube fitting onto the insert. However, this technique has not eliminated the need for molding the insert into the body. An alternate known expedient for attaching a metal insert onto the plastic valve body has been to provide a blind sealing threaded engagement between the plastic valve body and the metal insert. However, this technique has proven to be costly in the manufacture of the valve because threads must either be molded or machined into the plastic valve body and onto the metal insert, thereby increasing the manufacturing cost of the two components.

Therefore, it has long been described to provide a way or means of engagement of a metal insert onto the plastic valve body in a manner which eliminates molding or threaded connections and yet provides a fluid pressure tight seal.

In another aspect of the manufacture of electrically actuated appliance water inlet valves, theferro magnetic armature employed to effect opening of the valve must be movable within the valving chamber and yet isolated from the coil in order to maintain fluid tight integrity of the valving chamber. Known technique for providing assembly of such an arrangement have employed a non-metallic armature guide member received over the armature for guiding movement thereof during the valve opening and closing stroke. In the prior known valves, the armature guide is sealed onto the plastic valve body and retained against the forces of fluid pressure acting thereon by the coil and pole frame assembly. This sealing and retention technique of the armature guide member has resulted in costly mechanical fasteners received through the pole frame members and requires threadedly engaging the valve body with such fasteners in a manner sufficient to restrain the armature guide member against the force of the fluid pressure acting thereon. This known technique has required complete assembly of the armature, armature guide, coil and mounting frame members simultaneously during the manufacturing operation and has proven to be a costly and difficult to manage procedure with respect to concentric alignment of all the parts during production assembly. The conentricity problem is particularly complicated in view of the close sliding clearances between the armature and the guide needed to provide precise alignment of the armature for effecting reliable and repeatable valve operation.

The aforesaid tenchinque thus requires complete assembly of the valve before the valving cavity seal can be fluid pressure tested for sealing integrity which can result in rejection for seal failure at a more costly point in the manufacturing sequence.

Another problem encountered with known solenoid operated appliance water valves has been the problem of predetermining the flow rate of the valve, particularly where the valve has employed an elastomeric flow control washer which operates by pressure deformation in a precisely configured cavity. Heretofore, the flow rate of the valve having the flow washer encased therein could not be verified unit the valve was completely assembled. Consequently if the valve body was enclosed by non-metallic weldment at final assembly, in the event the flow washer did not funciton properly in the precision cavity to provide the required flow in the face of varying inlet pressure upon final testing. it was necessary to scrap the completed valve.

Thus, it has long been desired in the manufacture of a solenoid operated appliance water valve, to find a way or means of pre-assembling the armature and armature-guide onto the plastic valve body and sealing and retaining the sub-assembly thereof onto the valve body in operations separate from the assemblage of the coil and pole frame members there.

It has further been desired to find an inexpensive way of flow testing a flow control washer for use in a valve in its containment cavity without the necessity of completing the valve assembly.

SUMMARY OF THE INVENTION

The present invention provides an electrically energized electromagnetically operated plastic bodied appliance water valve having tube type fittings attached thereto for connection to a water supply line. The valve of the present invention employs a unique and novel sub-assembly of the plastic body, the ferro magnetic armature and non-metallic armature guide in a fluid pressure tight sub-assembly forming the valving chamber. The present invention utilizes a plastic armature guide with the armature, armature return spring and elastomeric valve seat positioned therein and inserted into the plastic valve body as a sub-assembly with a seal therearound. A non-metallic retainer is received over the armature guide and secured to the plastic valve body for retaining the armature and guide sub-assembly thereon in sealed engagement by suitable non-metallic weldment. The coil and magnet pole frame piece members are received over the armature guide and retained thereon without concern for retaining forces sufficient to overcome the force of the fluid pressure acting on the armature guide.

In another aspect of the valve of the present invention, an enlarged cavity is provided in the inlet portion of the valve body with a separate opening provided therein to permit internal access to the inlet. A suitable metal insert, adapted for receiving compression type tube fittings therein, is provided with an "O-ring" seal and assembled through an inlet bore provided in the valve body. A suitable retaining clip is inserted through the opening provided in the inlet and engages the metal insert for providing retention therein. A non-metallic closure is then sealed over the opening by suitable non-metallic weldment. The metal insert for tube attachment is restrained against torque loading by engagement with suitable twist resisting surfaces formed on the mounting bracket for the valve which is received over the metal insert after assembly of the insert onto the valve body.

The present invention thus provides a unique and novel solenoid operated appliance water inlet valve with a plastic body, wherein the valving chamber may be assembled and sealed prior to installation of the solenoid coil and pole frame pieces. The valve also allows a metal insert member to be assembled into the plastic body after molding for receiving compression tube fitting attachment thereto; and, the torque loading of the tube attachment is transmitted directly to the valve mounting bracket rather than to the plastic valve body. The metal insert for the tube fitting attachment is received on the valve body and sealed and retained thereon without the need for threaded engagement; and, the assembly thereof is completed prior to the installation of the mounting bracket.

In another aspect, the invention teaches a method of assembling of solenoid operated appliance valve having a flow control washer assembled into an insert which defines the precision volume cavity and the sub-assembly of the flow washer and insert is flow tested in a test fixture. The flow tested sub-assembly is then assembled into a valve body and sealed therein by weldment. In the event the sub-assembly fails the flow test, scrappage of valve body with the attached solenoid is prevented.

DETAILED DESCRIPTION

Figure 1:
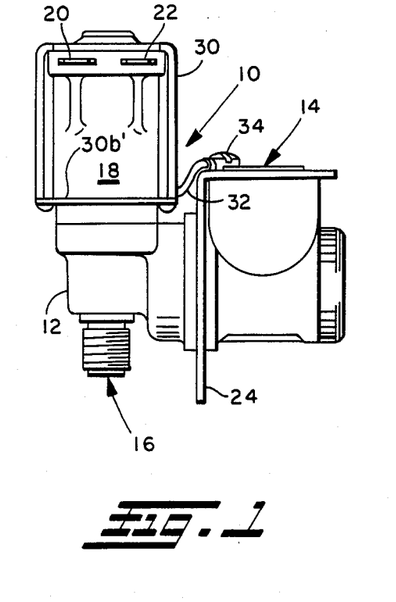
FIG. 1 is a side elevation view of the valve of the present invention.
Figures 2, 7:
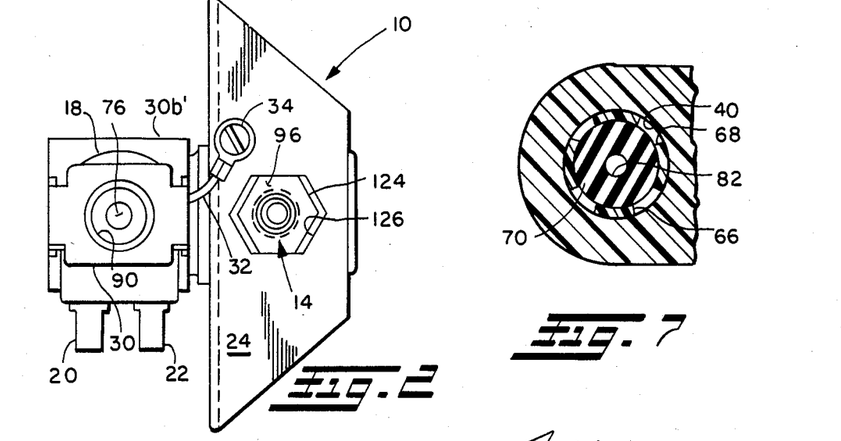
FIG. 2 is a top view of the valve of FIG. 1.
FIG. 7 is a partial sectional view taken along section indicating lines 7—7 of FIG. 4; and, FIG. 8 is a perspective view of the armature guide sub-assembly of the present invention.
Figure 3:
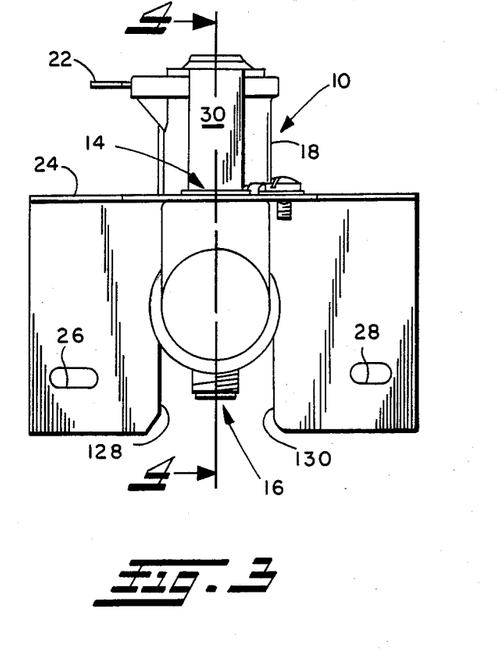
FIG. 3 is a right hand end view of the valve of FIG. 1.

Referring to FIGS. 1 through 3 the valve assembly indicated generally at 10 has a plastic valve body 12 having an inlet indicated generally at 14 and an outlet fitting indicated generally at 16. An encapsulated electrical coil 18 is mounted on the body 12 having externally extending electrical attachment terminals 20 and 22. A valve mounting bracket 24 having apertures 26, 28 therein is provided for attachment of the valve to the appliance to be supplied with water.

The coil has received thereover a suitable ferro magnetic pole frame 30 for completing the flow of magnetic flux about the coil. The pole frame 30 is grounded to the mounting bracket by a suitable electrical lead 32 shown connected to bracket 24 by a sheet metal screw 34.

Figures 3, 4:
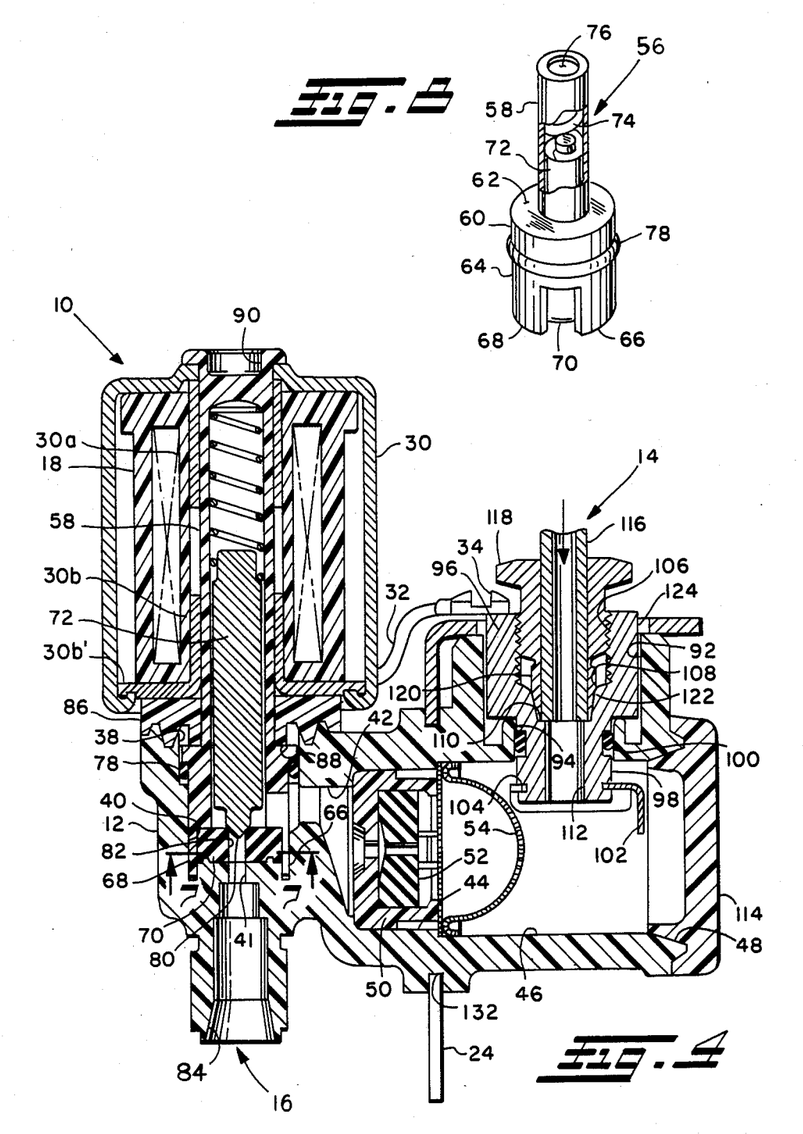
FIG. 4 is a section view of the valve of FIG. 1 taken along section indicating lines 4—4 of FIG. 3.

Referring to FIG. 4, the body 12 has an upwardly extending opening 38 provided therein and a reduced diameter bore 40 which has a smaller passage 41 therein and which communicates with outlet 16. The body has a cross-bore 42 formed therein which communicates with the cavity 40 and extends generally at right angles thereto and opens into an enlarged bore 44 which extends into inlet chamber 46. Chamber 46 is formed through an opening 48 provided in the right-hand end of the wall of the valve body 12, as illustrated in FIG. 4.

A flow control sub-assembly in the form of annular retainer 50 has captured therein an elastomeric deformable flow washer 52 and is received in bore 44 in closely fitting engagement therewith and is retainedtherein by a suitable filter screen 54 press fitted into the chamber 46.

Figure 9:
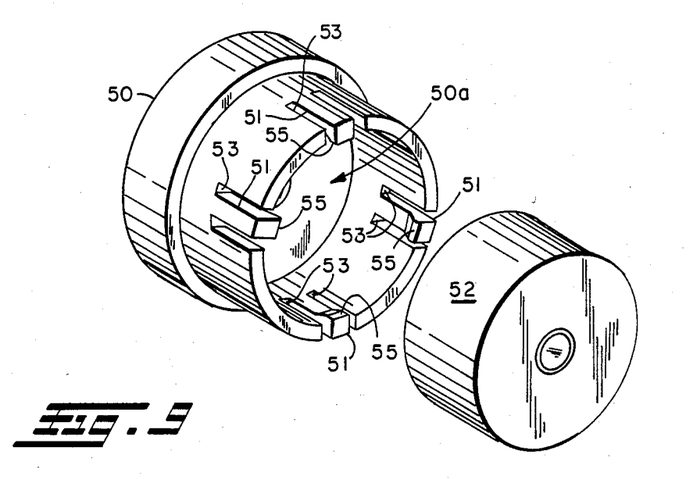
FIG. 9 is an exploded perspective view of the flow-waher sub-assembly of the present invention.

Referring to FIG. 9, the insert 50 has a cavity 50a formed therein configured and sized to precise dimensions as is known in the art, for controlling the deformation of flow washer 52 under variable inlet pressure. The insert preferably is formed of plastic and has a plurality of slots 53 formed in the rim thereof to create a plurality of curcumerentially spaced resilient tabs 51. Each of the tabs 51 has a radially inwardly extending projection or lug 55 provided thereon. The flow washer 52 is thus pressed into cavity 50a by resilient deformation of tabs 51 and periphery of washer 52. Upon assembly of washer 52 into cavity 50a tabs 51 snap back to their original position and lugs 55 engage the edge of washer 52 and retain the washer in the cavity. This completed sub-assembly may then be assembled into a suitable test fixture (not shown) which seals about the outer periphery of insert 50, thereby permitting the subassembly of FIG. 9 to be flow rate tested prior to installation in the valve body.

With reference to FIG. 8, an armature sub-assembly, indicated generally at 56, is illustrated as comprising an elongated tubular armature guide 58 having the lower portion thereof defining an enlarged diameter 60 and a transverse annular shoulder surface 62. The enlarged diameter portion 60 is disposed adjacent an intermediate diameter portion 64 which extends axially of the guide portion 58 and defines a plurality of circumerentially spaced arcuate end portions 66, 68 which have received therein in slight intereference fit, an annular valve seat member 70 formed of suitable elastomeric material.

Referring to FIG. 7, the valve seat 70 is shown in position as received between the arcuate portions 66, 68 on the armature guide portion 64 and which are arcuate portions are received in registration against the bore 40 formed in the valve body.

The upper portion 58 of the armature guide has a hollow tubular configuration with an armature member 72 formed of ferro-magnetic material slidably received therein in closely fitting arrangement A coil spring 74, having one end registered against the armature 72, and the other end contacting the closed end of the armature guide 58, is disposed within tubular portion 58 and biases the armature in a downward direction toward the valve seat 70.

With reference to FIG. 4, the sub-assembly 56 of FIG. 8 is received in the valving cavity 40 with the arcuate portions 68, 66 slidably engaging the bore 40 for guiding the sub-assembly therein.

A suitable elastomeric seal ring 78 is received over the intermediate diameter 64 of the armature guide 58 and upon installation of the sub-assembly 56 into the body, seal ring 78 is radially compressed by the wall of the opening 38 in the body for effecting a seal therebetween.

With reference to FIG. 4, the armature 72 has a tapered valve poppet 80 formed on the lower end thereof for contacting the corner of central bore 82 formed in the elastomeric valve seat 70 which communicates with passage 41 and port 84 provided in the outlet 16 upon installation of subassembly 56 onto the body.

Figure 10:
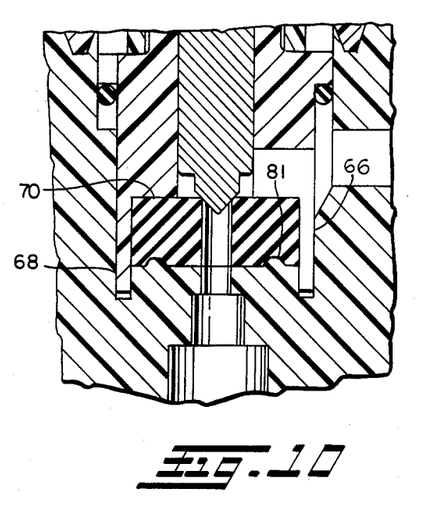
FIG. 10 is an enlarged view of the valve seat region of the embodiments of FIGS. 4 and 6.

Referring to FIG. 10, this valve seat 70 is pressed into contact with an annular rib 81 provided in the body for sealing against the undersurface of the valve seat 70 to prevent flow around the valve seat member.

The armature-guide sub-assembly 56 is retained in the valve body by an annular retainer member 86 received over the guide portion 58. Retainer 86 has a flange 88 about the inner periphery, which flange is registered against the shoulder 62 of the guide and secured to the valve body about the opening 38 by suitable non-metallic weldment as for example by, spin, or alternatively, ultrasonic welding or heat stake to the body 12.

In the presently preferred practice of invention, pole frame 30 includes a pair of axially spaced tubular members 30a and 30b centrally disposed with the upper member 30a received a recess in the upper end of the pole frame. The lower tubular member '30b having an outwardly extending flange 30b connected to the pole frame 30. The encapsulated coil 18 is thus received in the frame with the tubular members 30a, 30b extending centrally within the coil 18 for locating and retaining the coil within the pole frame 30.

The assembly of the pole frame and tubular inner members 30a and 30b is received over the upper portion 58 of the armature guide in free-sliding, but closely fitting relationship with the radially extending flange portion 30b of the lower tubular member registering against the upper face of the retainer 86. The pole frame sub assembly is retained on the armature guide 58 by outwardly flaring a cylindrical portion 90 of the armature guide which extends upwardly from the closed end 76. The cylindrical portion 90 is flared outwardly over the upper portion of the pole frame 30 adjacent the end of tubular pole member 30a.

Referring to FIG. 4, the inlet 14 of the valve comprises a second upwardly extending opening 92 provided in the wall of the body 12 and a reduced diameter bore 94, which communicates with the inlet chamber 46.

An insert member 96 formed of metallic material is received in the body bore 92 in closely fitting engagement. The insert 96 has a reduced diameter portion 98 received in the reduced diameter bore 94 in closely fitting engagement and portion 98 is sealed therewith by a suitable, seal such as O-ring 100. The insert 96 is retained in sealing engagement with the body opening 94 by a metal spring retaining clip 102 received in a groove 104 on the reduced diameter portion 98 of the insert. When the insert 96 has been inserted into the body and the retaining clip 102 secured thereon, an end cap 114 formed of non-metallic material and preferably plastic is received over the opening 48 and secured thereover in a manner effecting closure thereof by suitable non-metallic weldment such as by frictional, heat stake, or ultrasonic techniques.

A threaded opening 106 is provided in the upper end of insert 96 with the bottom of the threads terminating in a tapered compression surface 108 which is curved in cross-section. Compression surface 108 intersects an annular shoulder 110 which intersects a fluid passage 112 formed from the insert and which extends into the chamber 46.

With reference to FIG. 4, a water supply tubing 116 is received in the insert 96 with the end thereof registered against shoulder 110 and a suitable threadedtube fitting 118 is received thereover. Fitting 118 is threadedly engaged with threads 106 in the metal insert. Fitting 118 has integrally formed therewith, and frangible thereto, a compression fitting 120 provided thereon, which fitting 120 has a chamfered end 122 which cams against curved surface to provide a seal with a tubing 116. It will be understood that the fitting 118 and tubing 116 are omitted in FIGS. 1 through 3 for clarity of illustration.

Referring to FIGS. 1 through 4, the upper end of the insert 96 has formed thereon suitable engagement surfaces, such as the sides of a hexagon 124, which surfaces 124 are engaged by corresponding surfaces 126 provided in the mounting bracket 24 for preventing rotation of the insert 96 during installation of the tubing fitting 118.

The mounting bracket 24 has a bifurcated flange with spaced parallel edges 128, 130 (see FIG. 3) which engage opposite sides of a circular groove 132 (see FIG. 4) formed in the valve body 12.

Referring to FIG. 3, the spaced edges 128, 130 on the mounting bracket flange provide location of the mounting bracket for engagement of surfaces 126 with sides of the hexagon 124 of insert 96. Torque from fitting 118 during installation is transmitted through insert 96 and to mounting bracket 24 to thereby prevent fitting tightening forces from being transmitted to the plastic valve body.

Figures 5, 6:
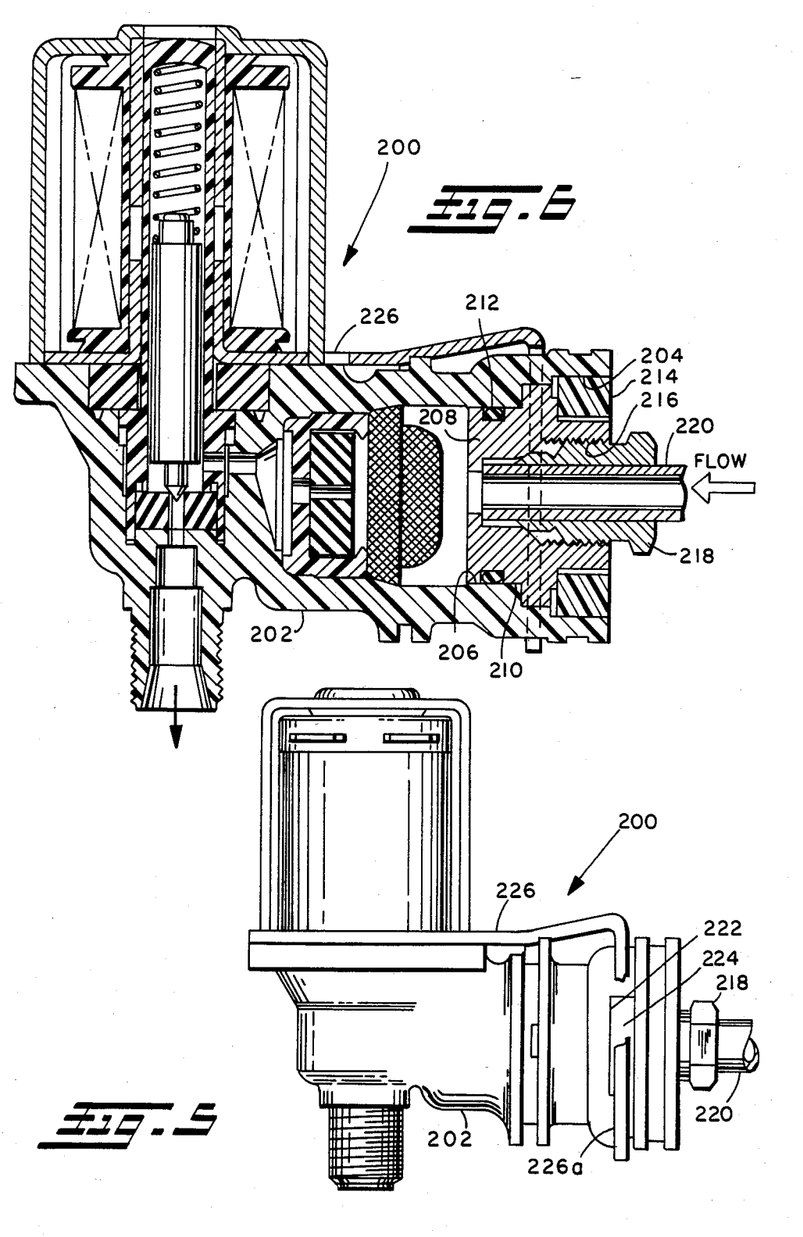
FIG. 5 is a view similar to FIG. 1 of an alternate embodiment of the invention.
FIG. 6 is a view similar to FIG. 4 and shows the valve of FIG. 5 in cross-section.

Referring now to FIGS. 5 and 6, another embodiment of a valve assembly in accordance with the present invention, indicated generally at 200, is illustrated and which differs from the valve 10 only in the construction of the inlet. The operative valve and electromagnetic actuator portions of the valve 200 are identical to those of the embodiment 10 of FIG. 1.

Referring to FIG. 6, the right-hand end portion of the valve body 202 has an opening 204 provided therein which has a larger diameter than the inlet chamber 206. A metal insert 208 is received in the opening 204 with a reduced diameter portion 210 thereof closely interfitting the inlet chamber wall 206 and sealed therebetween by a suitable seal such as O-ring 212. The insert 208 is retained in the opening 204 by a suitable non-metallic, preferably plastic, retaining ring 214 received over the insert and secured in the body by suitable non-metallic weldment such as by frictional or ultrasonic techniques. The insert 208 has a threaded bore 216 which has received therein a suitable compression type tube fitting 218, which may be identical to the fitting 118 employed in the embodiment of FIG. 4, and which has received therein a supply tube 220 for compression type retention in the insert 208.

With reference to FIG. 5, a portion of the wall of the body 202 is cut away in the region of the insert 208 in the form of a pair of oppositely disposed slots one of which is shown at 222 in FIG. 5. The slots such as 222 expose a flatened portion formed on the insert 208, one of which is shown and denoted by reference number 224 in FIG. 5.

With reference to FIGS. 5 and 6, the lower flange 226 of the electromagnetic pole frame is extended outwardly from the pole frame and along the valve body and has a downwardly extending portion 226a generally at right angles thereto. Bracket portion 226a is bifurcated and is received over the inlet insert portion of the valve body and engages the exposed surfaces, such as 224, to prevent rotation of the fitting 208 during torquing of the compression fitting 218.

The present invention thus provides a unique and novel electromagnetically actuated valve having a plastic body wherein the armature, valve poppet, plastic armature and valve seat sub-assembly may be installed in the valve body and sealed therein to provide retention thereof against fluid pressure forces and the integrity thereof tested without the need to assemble the electromagnetic coil thereon. The coil sub-assembly and mounting bracket may be attached as final steps in the assembly process. The valve of the present invention has a unique metal insert adapted for receiving a compression-type tube fitting which insert is assembled into the body and secured thereon by a retaining clip without the need for threaded engagement with the body and application of torque thereto. The reaction torque from the tube fitting on the metal insert is absorbed by the mounting bracket which is attached to the valve body as a separate installation.

Although the invention as hereinabove described with respect to the preferred practice, it will be understood that the invention is capable of modification and variation; and, the invention is, therefore, limited only by the following claims:

We claim:

1. An appliance valve assembly comprising:
   (a) valve body means formed of non-metallic material having an inlet and an outlet passage and a valving chamber communicating therewith, said inlet passage having a cavity formed therein;
   (b) a metallic insert received in said cavity and including sealing means providing fluid pressure sealing between the periphery of said insert and said cavity inlet passage, said insert having one selected from the group consisting of a compression, flare, or equivalent type tube retaining fitting threadedly received therein for connecting to a supply tube, said insert having at least one anti-rotation surface provided thereon;
   (c) mounting bracket means attached to said body means and adapted for external attachment thereto;
   (d) retaining means received over said insert means for securing said insert means in said body means cavity; and,
   (e) said bracket means including structure defining a surface complementary to and engaging said anti-rotation surface for preventing rotation of said insert means with respect to said body means upon torquing of said tube fitting.

2. The valve assembly defined in claim 1, wherein, said body means cavity has the wall thereof cut-away such that said anti-rotation surface is exposed through said cavity wall and engages said mounting bracket means complementary surface.

3. The valve assembly defined in claim 1, wherein said insert has a pair of spaced parallel flats formed thereon, and said bracket means defines a bifurcated portion having surfaces thereon engaging each of said flats through said cavity wall for preventing rotation of said insert.

4. The valve assembly defined in claim 1, wherein said retaining means comprises a non-metallic member received over said insert and secured to said body means by weldment.

5. The valve assembly defined in claim 1, wherein said insert has an end portion thereof extending into an enlarged area of said inlet and said retaining means comprises one selected from the group consisting of a spring clip, roll pin, or snap ring, or other retention means received over said extending portion.

6. The valve assembly defined in claim 1, wherein:
   (a) said body means inlet has an enlarged region with an opening formed therein through the wall of said body means;
   (b) said metallic insert has a portion thereof extending from said cavity into said inlet enlarged region;
   (c) said retaining means comprises spring clip means received through said opening and engaging said insert extending portion for retaining said insert in said cavity; and,
   (d) said opening has a cover thereover secured by weldment to said body means.

7. An electromagnetically operated appliance valve assembly comprising:
   (a) body means formed of non-metallic material having a valving chamber with an opening through the wall thereof and an inlet and outlet passage each communicating with said valving chamber;
   (b) means defining a valve seat in said valving chamber between said inlet and outlet passages;
   (c) ferromagnetic armature means including means defining a poppet, said armature means movable between a position spacing said poppet from and a position closing said poppet on said valve seat;
   (d) armature guide means formed of non-magnetic material and having therein a cavity defining surfaces for guiding of said armature movement with said armature means received in said cavity on said guide surfaces;
   (e) means sealing about said guide means in said opening in said valving chamber;
   (f) retaining means formed of non-metallic material similar to said body means and received over said guide means with first portions thereof disposed about said guide means registered thereagainst, said retaining means having second portions thereof defining registration surfaces thereon engaging with cooperating registration surfaces provided on said body means adjacent said opening through the wall thereof, said retaining means secured to said body means by non-metallic weldment of the material of said retaining means with said body means;

(g) spring means disposed in said guide means cavity, said spring means operative to urge said armature means in a direction closing said poppet means against said valve seat; and, (h) magnetomotive force means received over said guide means, including a coil and ferromagnetic pole means and operative upon electrical energization to effect movement of said armature means to open said valve.

8. The valve assembly defined in claim 7 wherein said armature guide means comprises a member formed of non-metallic material.

9. An armature guide sub-assembly comprising:
(a) a tubular non-magnetic guide member having one end thereof closed and the other end open with an enlarged diameter portion formed adjacent to the open end;
(b) ferro-magnetic armature means received in said closed end portion in closely fitting sliding engagement; said armature means including defining a valveing surface thereon;
(c) a bias spring received in said tubular member with one reaction end of said spring registered against said armature and biasing said armature means in a direction toward said open end;
(d) a valve seat member formed of elastomeric material received in said enlarged diameter portion of said guide member and retained therein substantially by frictional forces for holding said armature means and bias spring in said guide member.

10. The assembly defined in claim 9, wherein said enlarged diameter portion of said guide member has at least one projection formed on the inner periphery thereof for locally compressing said elastomeric valve seat member for aiding retention therein;

11. The assembly defined in claim 9, wherein said enlarged end of said guide member has at least one slot therein for effecting radial resiliency of said enlarged diameter portion;

12. The assembly defined in claim 9, wherein said enlarged end of said guide member has a plurality of peripherally spaced slots formed therein to effect radial resiliency of said enlarged diameter portion;

13. The assembly defined in claim 9, wherein said enlarged diameter portion of said guide member has a plurality of projections formed on the inner periphery thereof for locally compressing said elastomeric valve seat member for aiding retention therein;

14. A method of manufacturing a solenoid operated valve comprising the steps of:
(a) providing a non-metallic valve body with an opening valving cavity and inlet passage communicating therewith;
(b) assembling valve seat, armature and armature guides in said cavity opening and sealing thereabout by non-metallic weldment;
(c) securing an electrical coil and pole frame over said guide;

(d) providing an annular insert having a precision volume cavity and assembling a resilient flow control washer therein to form a sub-assembly;
(e) flow testing said flow washer in said sub-assembly; and,
(f) installing said sub-assembly in said inlet passage and sealing said inlet by non-metallic weldment.

15. The method defined in claim 14, wherein said steps of assembling said flow washer in said insert includes the step of providing a plurality of tabs on said insert and snap locking said flow washer over said tabs into said precision cavity.

16. An electromagnetic appliance valve assembly comprising:
(a) body means formed of non-metallic material, having a valving chamber with an opening through the wall thereof and an inlet and an outlet passage each communicating with said valving chamber;
(b) means defining a valve seat in said valving chamber between said inlet and outlet passages said valve seat comprising an elastomeric washer.
(c) ferromagnetic armature means including means defining a poppet, said armature means movable between a position spacing poppet from and a position closing said poppet on said valve seta;
(d) armature guide means having a cavity defining therein surfaces for guiding of said armature movement with said armature means received in said cavity on said guide surfaces and wherein said elastomeric washer is retained in said cavity by said guide means;
(e) means sealing said guide means in said opening in said valving chamber;
(f) retaining means formed of non-metallic material received over said guide means securing said guide means to said body means by weldment;
(g) bias means disposed in said guide means cavity and operative to bias said armature means in a direction closing said poppet means against said valve seat; and,
(h) magnetomotive force means received over said guide means, including a coil and ferromagnetic pole means and operative upon electrical energization to effect movement of said armature means to open said valve.

17. An electromagnetic operated appliance valve assembly comprising:
(a) body means formed of non-metallic material having a valving chamber with an opening through the wall thereof and an inlet and outlet passage each communicating with said valving chamber;
(b) means defining a valve seat in said valving chamber between said inlet and outlet passages;
(c) ferromagnetic armature means including means defining a poppet, said armature means movable between a position spacing said poppet from and a position closing said poppet on said valve seat;
(d) armature guide means formed of non-magnetic material and having therein a cavity defining surfaces for guiding of said armature movement with said armature means received in said cavity on said guide surfaces;
(e) means sealing about said guide means in said opening in said valving chamber;
(f) retaining means formed of non-metallic material similar to said body means and received over said guide means with first portions thereof disposed about said guide mans registered thereagainst, said retaining means having second portions thereof defining registration surfaces thereon engaging with cooperating registration surfaces provided on said body means adjacent said opening through the wall thereof, said retaining means secured to said body means by non-metallic weldment of the material of said retaining means with said body means;

(g) spring means disposed in said guide means cavity, said spring means operative to urge said armature means in a direction closing said poppet means against said valve seat; and, (h) magnetomotive force means received over said guide means, including a coil and ferromagnetic pole means and operative upon electrical energization to effect movement of said armature means to open said valve, said pole means comprising a pair of spaced tubular members received, over said guide means and an outer frame member received over said coil and connecting to said tubular members.

* * * * *